United States Patent [19]
Janca et al.

[11] Patent Number: 5,543,693
[45] Date of Patent: Aug. 6, 1996

[54] METHOD FOR THE CONTROL OF THE OPENING AND CLOSING PROCESS OF ELECTRICALLY-DRIVEN DEVICE

[75] Inventors: Reiner Janca, Dorsten; Reinhold Spieker, Werdohl, both of Germany

[73] Assignee: Leopold Kostal GmbH & Co. KG, Ludenscheid, Germany

[21] Appl. No.: 251,898

[22] Filed: May 31, 1994

[30] Foreign Application Priority Data

Jun. 1, 1993 [DE] Germany ............... 43 18 128.7

[51] Int. Cl.⁶ .................................. H02P 3/00
[52] U.S. Cl. ........................ 318/283; 318/466
[58] Field of Search .................. 318/280–286, 318/466–470; 49/26, 28, 29, 30, 138; 160/291, 292, 293.1

[56] References Cited

U.S. PATENT DOCUMENTS

| | | | |
|---|---|---|---|
| 4,364,003 | 12/1982 | Phipps | 318/467 |
| 4,393,342 | 7/1983 | Matsuoka et al. | 318/467 |
| 4,831,509 | 5/1989 | Jones et al. | 49/28 X |
| 4,870,333 | 9/1989 | Itoh et al. | 318/286 |
| 4,924,154 | 5/1990 | Ogino | 318/286 |
| 5,278,480 | 1/1994 | Murray | 318/266 X |
| 5,396,158 | 3/1995 | Long et al. | 318/282 |

FOREIGN PATENT DOCUMENTS 3136746 6/1983 Germany.

Primary Examiner—Jonathan Wysocki
Attorney, Agent, or Firm—Brooks & Kushman P.C.

[57] ABSTRACT

A method for the electronic monitoring and control of the opening and closing processes of an electrically driven device with an anti-jam facility for use in motor vehicles. The device includes an electric motor connected to a vehicle electrical system and an electric motor being operable in two directions assigned to the device. The device is capable of influence directly by means of electric operating elements or indirectly by means of a sensor apparatus which determines the parameters associated with the device.

6 Claims, 2 Drawing Sheets

METHOD FOR THE CONTROL OF THE OPENING AND CLOSING PROCESS OF ELECTRICALLY-DRIVEN DEVICE

TECHNICAL FIELD

The present invention relates to a method for the electronic monitoring and control of the opening and closing processes of electrically driven devices. More specifically, the method of this invention relates to anti-jam facilities which are intended for use in motor vehicles.

BACKGROUND ART

A method corresponding to that described in the prior art section of the main claim has become known through DE 31 36 746 C2. In this method, the relevant parameters of the device are made known to the control configuration by means of a sensor apparatus. Continuously, the control configuration is informed, among other things, of the direction of movement, the position and the speed of the device. In order that this information may be as precise as possible, the sensor apparatus allocated to each device consists of two sensor elements, arranged out-of-line. If such an arrangement is chosen, however, each sensor element needs costly individual carrier elements and resistors.

SUMMARY OF THE INVENTION

The present invention aims to reduce the number of components needed for the determination of the positional parameters of the relevant device, while retaining a monitoring and control process which is as simple as possible.

The main advantage of the present invention is that despite considerably reduced manufacturing costs, secure protection against jamming of the device is guaranteed.

BRIEF DESCRIPTION OF THE DRAWINGS

For clarification purposes, a particularly advantageous form of the invention is shown in the attached drawings, whereby.

BEST MODE FOR CARRYING OUT THE INVENTION

Figure 1:
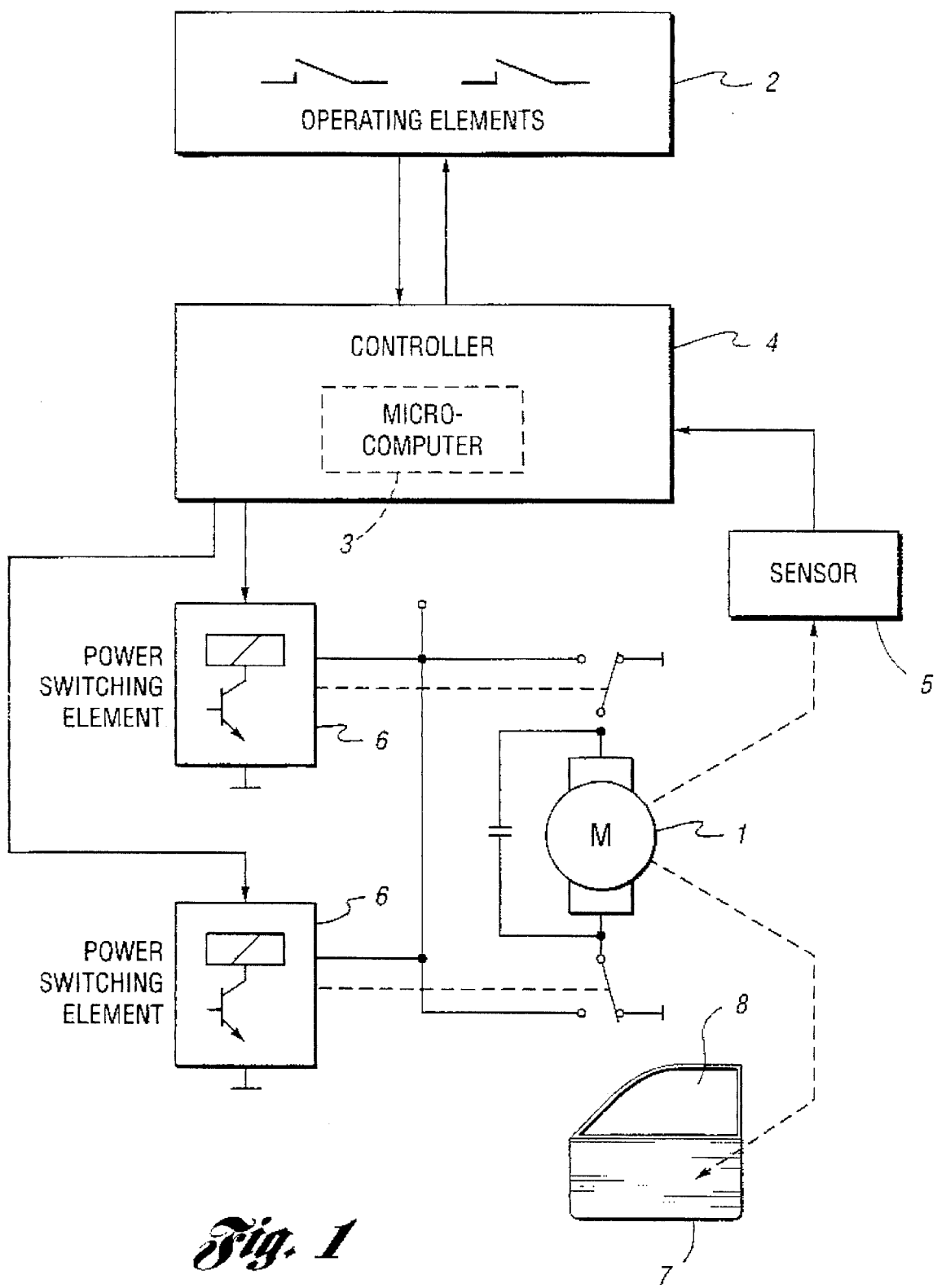
FIG. 1 shows a circuit diagram of a power window device.

As can be seen in the circuit diagram shown in FIG. 1, the device is here in the form of a power window system and consists principally of an electric motor 1 connected to a motor vehicle electrical system, the operating elements 2 necessary for the immediate influencing of the electrical motors 1, an electronic control configuration 4 which is provided with a microcomputer 3, a sensor element 5 which informs the control configuration 4 of the positional parameters of the power window device, and two power switching elements 6 which change over the direction of the electric motor 1, as well as mechanical elements mounted in the door of the vehicle 7, which for the sake of convenience are not shown.

Figure 2:
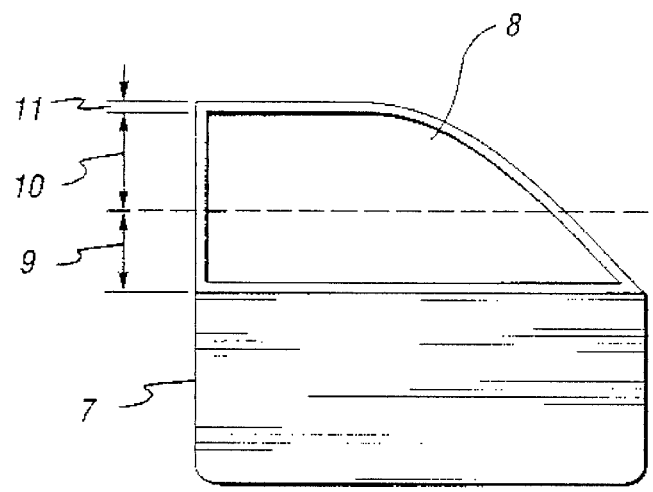
FIG. 2 shows a schematic motor vehicle door.

As particularly shown in FIG. 2, pane 8 belonging to the power window system moves through three zones 9,10,11 while closing from the "fully open" position. In the bottom sector 9 and top sector 11, the electric motor 1 is only shut off when it has been blocked for a predetermined, relatively short time. The middle sector 10 represents the so-called "safety zone", in which, starting from a time period designated Tp which is continually corrected, continual monitoring takes place in order to establish whether subsequently measured time periods designated Tp+1 have exceeded a switch-off time period Ta which is established as a threshold value. Switch-off time period Ta is calculated by microcomputer 3 based on the position parameters of the power window system which are determined by sensor element 5. In the calculation process, values from the previously determined time periods Tp, the direction of movement of window pane 8, the position of window pane 8, the speed of movement of window pane 8 and the operational voltage range of electric motor 1 up to the point in time in which the measurements are made. If the subsequently measured time period Tp+1 exceeds switch-off time period Ta, the so-called anti-jam facility of the power window system comes into play. In other words, electric motor 1 is switched off and driven in a reverse direction at a point in time designated as reverse point tr, so that pane 8 is opened at least slightly.

The above process can be expressed as a formula as follows:

If Tp+1<Ta, there is no need for reversal.

If Tp+1>=Ta, both power switching elements 6 are switched over without any time delay, so that reverse operation of pane 8 is initiated at reverse point tr.

In the second, so-called safety sector, however, electric motor 1 should only be switched off and reverse operation initiated when there is good reason, for example when a part of the body is jammed between window and frame.

Because the external features of the power window do not offer constant reference conditions, the values determined by sensor element 5, which is in the form of a Hall element, or a light barrier must always be seen in connection with the position of pane 8. For this reason, the position of pane 8 is determined by means of a counter contained in microcomputer 3. During the closing process and starting from the "fully open" position, the counter value is decreased from the maximum value MAX by one point at every appearance of a positive or rising edge in the signal which is transferred from sensor element 5 to control configuration 4. In this way, the value in the counter is continuously reduced until the pane is in the "fully closed" position. When the pane 8 is lowered, the counting direction of the counter is reversed, so that the appearance of each rising edge in the sensor signal S means that the value in the counter is continuously raised depending on the position reached by the pane. It is also absolutely essential to determine the direction of rotation of electric motor 1, so that the counting direction of the counter can be reversed and the value in the counter correctly raised or lowered. This is particularly important as the direction of rotation of electric motor 1 with associated direction of movement of the pane can be reversed at any point in the raising or lowering process.

It is difficult to determine the direction of rotation the motor and therefore the position of the pane with only one sensor when the end position of the pane 8 cannot be exactly determined after motor 1 has ceased to rotate after being switched off. The end position cannot be exactly determined, for example, when operating elements 2 are switched rapidly to and fro with the motor at a standstill. This problem can be avoided relatively easily by means of a sufficient hysteresis of sensor element 5.

Recognition of the direction of rotation can also be difficult with one sensor element 5 when electric motor 1 is driven to switch off in the blocked mode (bottom sector 9 or top sector 11). In order to avoid uncertainty as to the direction of rotation in this case, the counting direction of the counter must be reversed when motor 1 is blocked, before power switching device 6, in the form of a relay, which is allocated to the relevant direction, is switched off.

As the power window system is placed under tension when electric motor 1 is blocked, it is logical that without a positive drive only rotational movement against the direction of the block is possible, which means that a particular direction of rotation can be clearly allocated to sensor signals S.

Additionally, it can also occur that the direction of rotation cannot be defined when there are rapid changes of rotational direction of electric motor 1 or of the direction of movement of pane 8. When the direction of rotation of electric motor 1 is reversed rapidly, caused by rapid operation of operating elements 2, the direction of rotation of electric motor 1 no longer agrees with the switching command given by the two power switching elements 6, each of which is allocated to one particular direction of rotation, so that determination of the actual direction of rotation with one sensor element 5 and therefore a clear definition of the position of pane 8 of the power window system is no longer possible. In this case, the restart of movement of pane 8 or of reactivation of motor 1 can be delayed by means of a defined "off" time. This "off" time must be longer than the running-down time of electrical motor 1 after it has been switched off. This method of determining exactly the direction of rotation also brings with it an improvement of the function of the system. This is because the user's attempts to play with the system with rapid operation of operating elements 2 in order to achieve rapid changes of direction in the operation of the power window are not successful, leading to reduced wear on the system as a whole.

In addition, it is extremely difficult to precisely determine the rotational direction by means of one sensor element 5. When the anti-jam facility is activated, the window lift device or the electric motor 1 is switched over from the closing to the opening mode without any appreciable time delay (change of rotational direction). The necessary switchover of the two power switching elements 6 which are assigned to each rotational direction is achieved in less than 3 ms. In order to recognize clearly the direction of displacement of pane 8 or the rotational direction of the electric motor 1, a switch-off period Ta is calculated by microprocessor 3 on the basis of a previously measured time period Tp, whereby the switch-off period Ta is used as a threshold value and compared with the subsequently measured time period Tp+1 in synchronization with the positive flank of sensor signal S.

Figure 3:
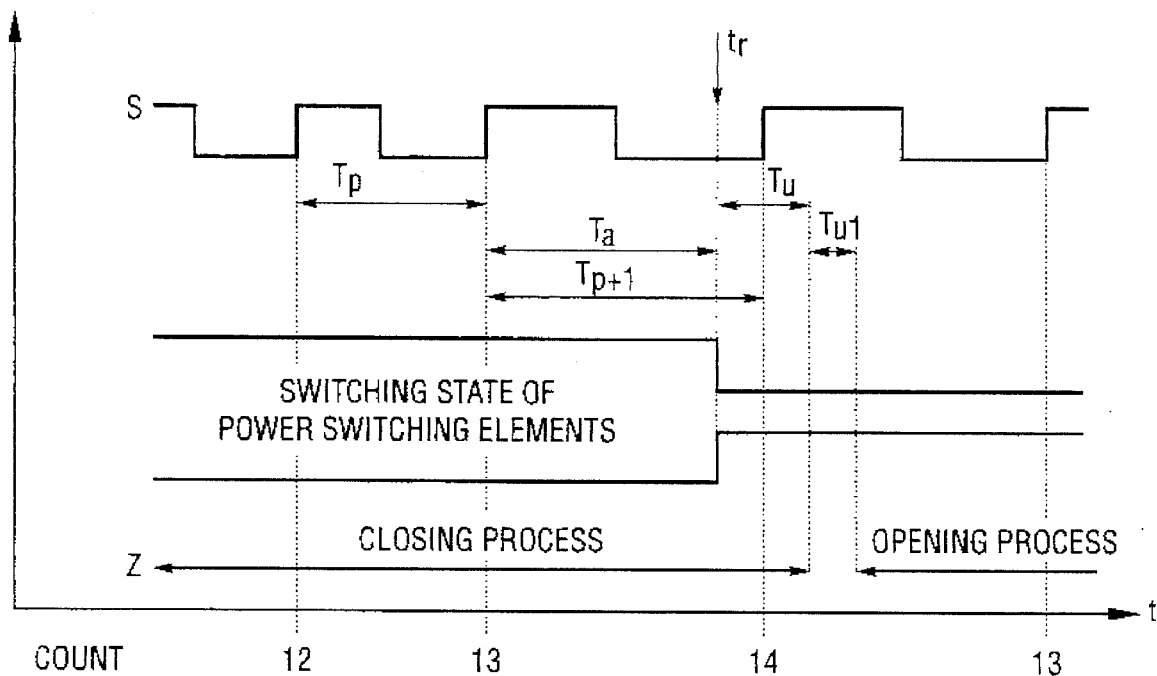
FIG. 3 shows the course of the sensor signal in the case that the device is subject to jamming.

FIG. 3 specifically shows sensor signal S as generated by sensor element 5 in the case where the anti-jam facility comes into play. In this particular example, the last time period Tp of the sensor signal S measured before the reversal point tr (displacement direction of pane 8/rotational direction of electric motor 1 reversed) is supplied to the microprocessor 3 as a calculation base. By means of a calculation program microprocessor 3 generates a so-called switch-off period Ta based on the last time period Tp in synchronization with the positive edge of sensor signal S. In this process, switch-off period Ta is calculated by microprocessor 3 based on the displacement parameters of the window lift system which are generated by sensor element 5. The values of the previously measured time period Tp, the displacement direction of pane 8, the position of pane 8, the displacement speed of pane 8 and the operational voltage range of electric motor 1 up to the point when the measurement is taken are included in the calculation. In any event, pane 8 must have been reversed by the end of switch-off time period Ta if no positive edge appears in the sensor signal during this period. That means that calculated switch-off time period Ta is compared with subsequently measured time period Tp+1, being used as a threshold value to determine the directional change of electric motor 1. Because of this, after the anti-jam facility of pane 8 (reverse point tr) has been activated, time periods Tu and Tu1 must be calculated after reverse point tr so that the counter responsible for determining the position of pane 8 can be raised or decreased by the appropriate amount. This is also particularly seen in FIG. 3. In this, Tu corresponds to the period in which a positive edge in sensor signal S is still being counted in the closing direction of pane 8. Tu1 is the time period in which no positive edges appear in sensor signal S.

In the reversal procedure shown in FIG. 3, the following apply:

1) Edge before reversal point tr<=tr+Tu The rotational direction of the motor has not yet changed; pane 8 is in the process of closing.

2) Edge after reversal point tr+Tu<=t tr+Tu+Tu1
The rotational direction of the motor is not defined: the direction of displacement of pane 8 cannot be established.

3) Edge after reverse point t>=tr+Tu+Tu1 The rotational direction of the motor has been reversed; the pane is in the process of opening.

Because of the synchronization of the calculation program stored in microprocessor 3 with sensor signal S of sensor element 5, a period of time is created (case 2), in which no edges can appear in sensor signal S. Because of this the rotational directions of electric motor 1 can be determined without possibility of error.

In light of the previous disclosure, it will now be seen that the invention relates to a method for the electronic monitoring and control of the opening and closing process of electrically driven devices. One aim is to considerably reduce the components necessary for establishing the displacement parameters of the devices in question while maintaining a process which is essentially simple. This task is achieved by means of a microprocessor in the control system which calculates a time period in synchronization with the sensor signal. In that time period, the counter counts the positive edges in the sensor signal generated by the sensor element in the direction obtaining before the reversal point. The microprocessor also calculates a time period after the passing of which positive edges in the sensor signal are counted by the counter in the direction opposite to that obtaining before the reversal point.

What is claimed is:

1. A method for controlling the opening and closing processes of a device, the device being driven by an electric motor operable in two rotational directions the motor being capable of influence directly by means of electric operating elements or indirectly by means of a sensor apparatus which determines a plurality of parameters associated with the device including displacement direction, displacement position and displacement speed, via control electronics containing a microprocessor with a counting facility, the method comprising:

generating a sensor signal (S) having positive edges corresponding to rotational motion of the motor;

measuring a time period (Tp) of the sensor signal (S);

calculating a switch-off period (Ta) using the time period (Tp) of the sensor signal (S);

establishing a reverse point (tr) indicative of a change in rotational direction of the electric motor (1) using the switch-off period (Ta) as a threshold value therefor;

calculating a time period (Tu) starting from reverse point (tr);

calculating a time period (Tu1) starting from reverse point (tr);

measuring a time period (Tp+1) of the sensor signal (S);

comparing the switch-off period (Ta) in synchronization with the time period (Tp+1) of the sensor signal (S);

reversing the rotational direction of the motor when the time period (Tp+1) of the sensor signal (S) exceeds the switch-off period (Ta);

adjusting the counting facility in a first direction in response to a positive edge appearing in the sensor signal (S) before the passing of the time period (Tu); and adjusting the counting facility in a second direction in response to a positive edge appearing in sensor signal (S) after the passing of the time period (Tu1).

2. The method of claim 1, characterized in that the operational voltage of the motor is used for the calculation of switch-off period (Ta).

3. The method of claim 1 or claim 2, characterized in that sensor element (5) is in the form of a Hall effect sensor.

4. The method of claim 1 or claim 2 characterized in that sensor element (5) is in the form of a light barrier.

5. The method of claims 1 or 2, characterized in that the path to be travelled by the device during the opening and closing processes is divided into three portions (9,10,11), namely a first portion (9) from completely open to approximately half open, a second portion (10) from approximately half open to almost completely closed and in a third portion (11) from almost completely closed to completely closed, whereby the plurality of parameters are only taken into consideration if the device is positioned within the second portion (10).

6. The method of claim 1 further comprising:

adjusting the counting facility in the first direction in response to a positive edge appearing in the sensor signal (S) when the switch-off period (Ta) exceeds the time period (Tp+1) of the sensor signal (S); and adjusting the counting facility in the second direction in response to a positive edge appearing in the sensor signal (S) when the time period (Tp+1) exceeds the switch-off period (Ta).

* * * * *